(12) United States Patent
Yang et al.

(10) Patent No.: US 8,830,675 B2
(45) Date of Patent: Sep. 9, 2014

(54) COVER STOPPER STRUCTURE AND FOLDABLE ELECTRONIC DEVICE USING SAME

(75) Inventors: Nai-Lin Yang, New Taipei (TW); Xiao-Meng Zhou, Shenzhen (CN); Wei Gong, Shenzhen (CN); Zheng-Ping Tan, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 163 days.

(21) Appl. No.: 13/456,502

(22) Filed: Apr. 26, 2012

(65) Prior Publication Data

US 2013/0021726 A1 Jan. 24, 2013

(30) Foreign Application Priority Data

Jul. 18, 2011 (CN) .......................... 2011 1 0200428

(51) Int. Cl.
G06F 1/16 (2006.01)
H05K 5/00 (2006.01)
H05K 7/00 (2006.01)
H04M 1/02 (2006.01)

(52) U.S. Cl.
CPC .................................. H04M 1/0216 (2013.01)
USPC ............ 361/679.56; 361/679.01; 361/679.02; 361/679.27; 455/573.3; 379/433.13

(58) Field of Classification Search
CPC .................................................. H04M 1/0215
USPC ............. 361/679.01, 679.28, 679.55, 679.27, 361/679.56; 16/342, 376, 374; 455/575.3; 379/433.13
See application file for complete search history.

(56) References Cited

U.S. PATENT DOCUMENTS

| | | | | |
|---|---|---|---|---|
| 7,847,194 B2 * | 12/2010 | Kuwajima et al. | ......... | 174/161 R |
| 7,974,666 B2 * | 7/2011 | Kosugi et al. | .............. | 455/575.3 |
| 8,004,833 B2 * | 8/2011 | Tseng et al. | ............. | 361/679.55 |
| 8,264,823 B2 * | 9/2012 | Kim et al. | ................ | 361/679.01 |
| 8,370,994 B2 * | 2/2013 | Duan et al. | ...................... | 16/330 |
| 8,422,214 B2 * | 4/2013 | Furumatsu et al. | ...... | 361/679.28 |
| 8,432,677 B2 * | 4/2013 | Duan et al. | ............... | 361/679.27 |
| 8,549,709 B2 * | 10/2013 | Luo et al. | ......................... | 16/303 |
| 2007/0084015 A1 * | 4/2007 | Zuo et al. | ......................... | 16/354 |
| 2008/0066262 A1 * | 3/2008 | Liu et al. | ......................... | 16/319 |
| 2009/0007379 A1 * | 1/2009 | Zhang et al. | ..................... | 16/295 |
| 2009/0178238 A1 * | 7/2009 | Wei | .............................. | 16/221 |
| 2009/0260183 A1 * | 10/2009 | Chen et al. | ..................... | 16/223 |
| 2010/0162526 A1 * | 7/2010 | Duan et al. | ..................... | 16/303 |
| 2010/0180401 A1 * | 7/2010 | Duan et al. | ..................... | 16/250 |
| 2011/0157787 A1 * | 6/2011 | Duan et al. | ............... | 361/679.01 |
| 2011/0222260 A1 * | 9/2011 | Goro et al. | ..................... | 361/814 |
| 2011/0286160 A1 * | 11/2011 | Duan et al. | ............... | 361/679.01 |
| 2012/0099248 A1 * | 4/2012 | Shao et al. | ............... | 361/679.01 |
| 2012/0206872 A1 * | 8/2012 | Duan et al. | ............... | 361/679.01 |

* cited by examiner

Primary Examiner — Lisa Lea Edmonds
Assistant Examiner — Keith Depew
(74) Attorney, Agent, or Firm — Novak Druce Connolly Bove + Quigg LLP

(57) ABSTRACT

A foldable electronic device includes a frame cover, a foldable cover foldably mounted on the frame cover, and a cover stopper structure. The cover stopper structure includes a stopper fixed to the frame cover and made of a metal material. The cover stopper structure further includes a rotatable member fixed to the foldable cover, made of Polyoxymethylene, rotatably along the stopper and can be stopped by the stopper.

11 Claims, 9 Drawing Sheets

COVER STOPPER STRUCTURE AND FOLDABLE ELECTRONIC DEVICE USING SAME

BACKGROUND

1. Technical Field

The present disclosure relates to a cover stopper structure and foldable electronic device using the cover stopper structure.

2. Description of the Related Art

Foldable electronic devices such as foldable mobile phone generally include a body and a cover foldable relative to the body. When the cover is folded to open at a desire angle, it is sometimes necessary to lock the cover by a cover stopper structure. Cover stopper structures are generally made of plastic materials. However, due to lack of sufficient strength and anti-abrasion capabilities, the plastic cover stopper structure tends to fail after many folding cycles.

Therefore, there is room for improvement within the art.

BRIEF DESCRIPTION OF THE DRAWINGS

Many aspects of the present cover stopper structure and a foldable electronic device using same can be better understood with reference to the following drawings. The components in the drawings are not necessarily drawn to scale, the emphasis instead being placed upon clearly illustrating the principles of the present cover stopper structure and the foldable electronic device. Moreover, in the drawings, like reference numerals designate corresponding parts throughout the several views.

DETAILED DESCRIPTION

Figure 1:
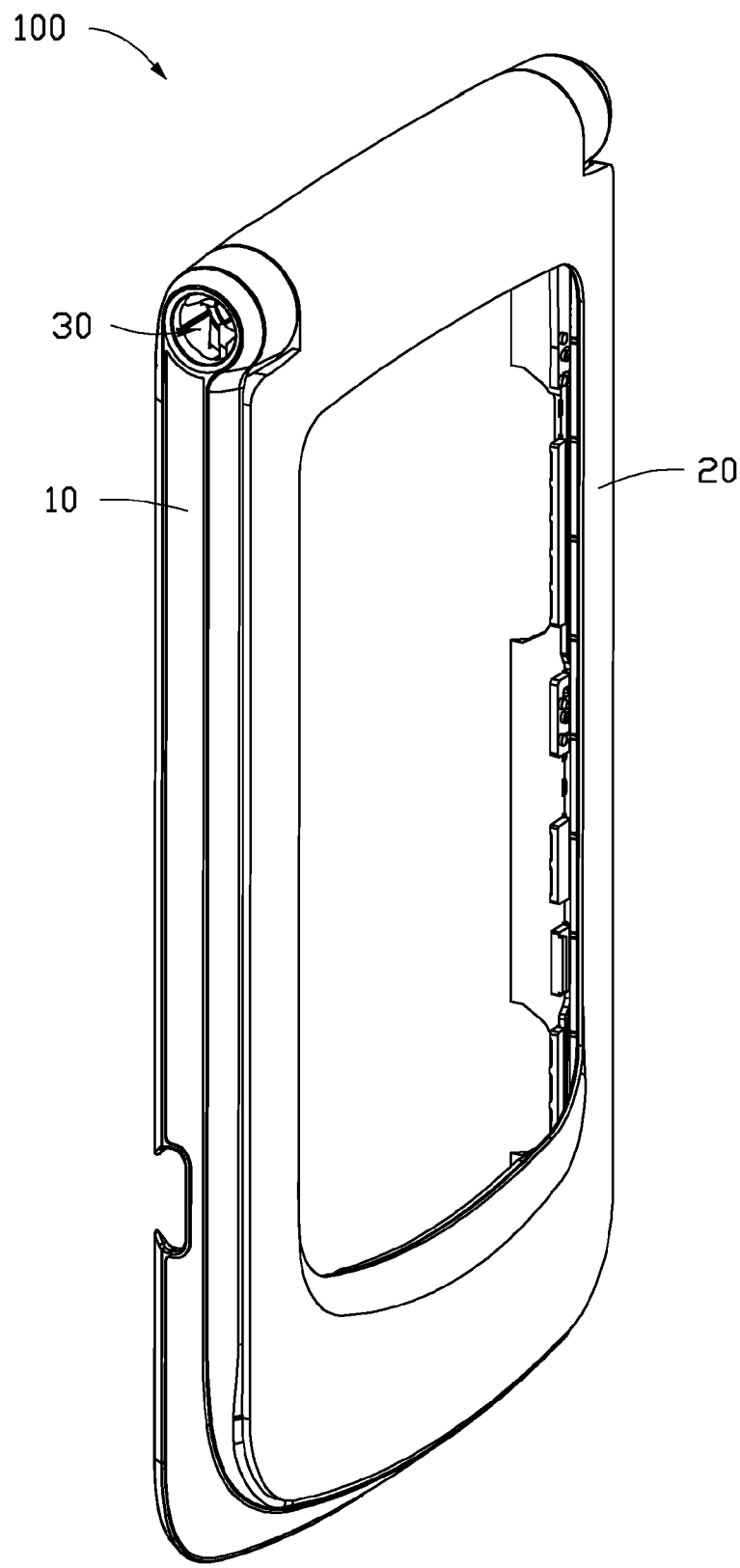
FIG. 1 is an isometirc view of a foldable electronic device according to an embodiment.

FIGS. 1 through 9 show an exemplary foldable electronic device 100 including a cover stopper structure 30. The cover stopper structure 30 includes a stopper 32 fixed to a frame cover 10 of the electronic device 100 and a rotatable member 34 fixed to the foldable cover 20 of the electronic device 100. The foldable cover 20 can be foldably connected to the frame cover 10 by a hinge 40 mounted in a second mounting portion 16 in the frame cover 10 (see FIGS. 1-3). During folding the foldable cover 20 relative to the frame cover 10, the rotatable member 34 rotates along the stopper 32. Until the stopper 32 stops the rotatable member 34, the foldable cover 20 stops to rotate and the foldable electronic device 100 is completely opened.

The stopper 32 can be made of a metal material, and the rotatable member 34 can be made of Polyoxymethylene. The metal material and the Polyoxymethylene are provided with high strength and anti-abrasion capability. Accordingly, due to material properties, the stopper 32 and the rotatable member 34 can endure repeated impacts by stopping the rotation between them. The following description refers to detailed structure and assembly method of the foldable electronic device 100.

Figure 2:
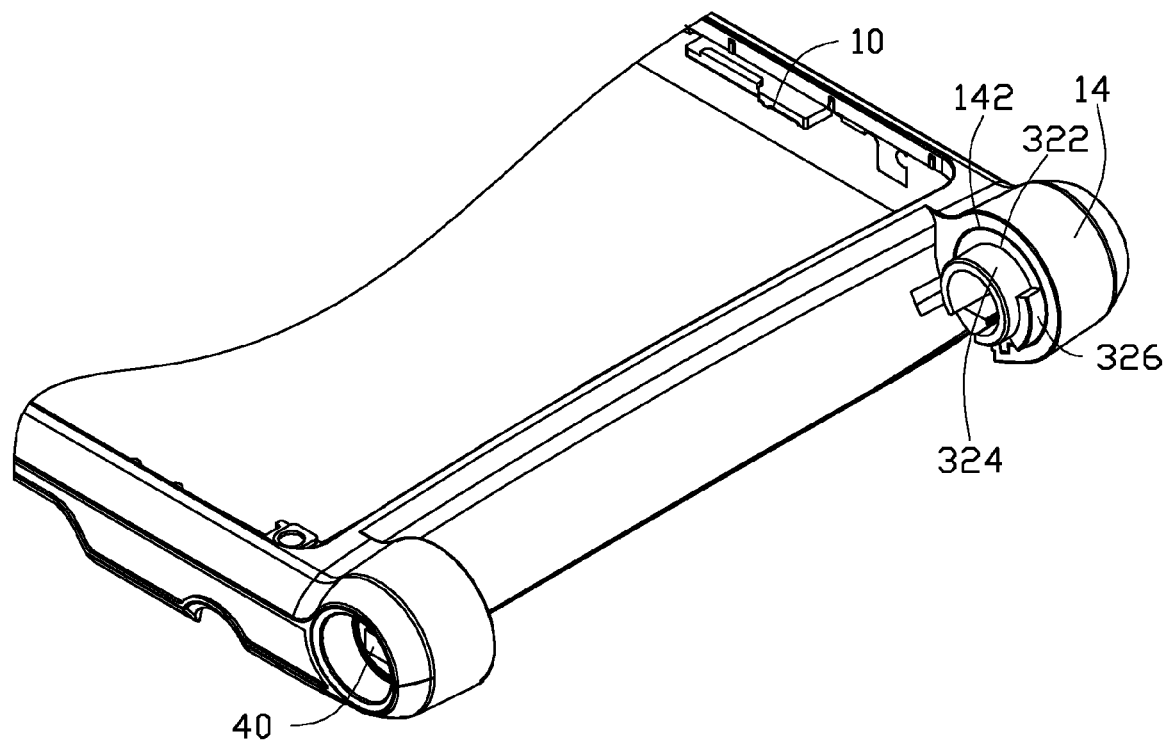
FIG. 2 is an isometric view of a frame cover and a stopper after assembly according to the embodiment shown in FIG. 1.
Figure 3:
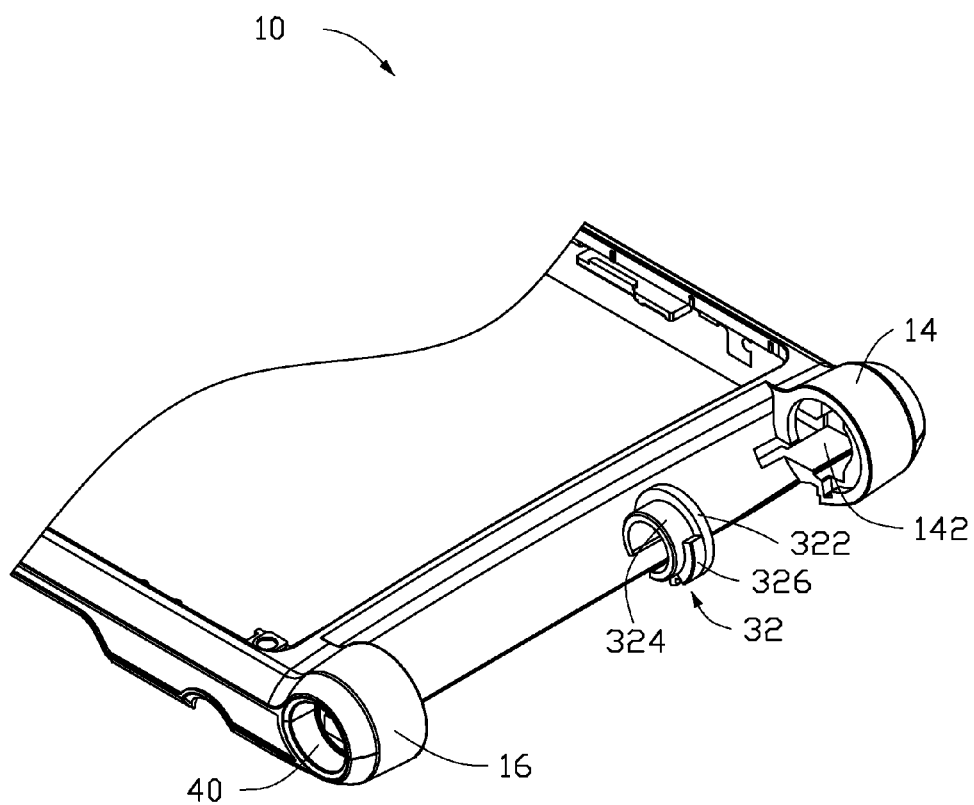
FIG. 3 is similar to FIG. 2, but in an exploded view.

Referring to FIGS. 2 and 3 in detail, the stopper 32 includes a tube 324 and a first block 326 formed on a circumferential surface of the tube 324. The stopper 32 further includes a mounting plate 322 for fixing the stopper 32 to the frame cover 10. The tube 324 and the first block 326 extend from the same surface of the mounting plate 322.

Figure 4:
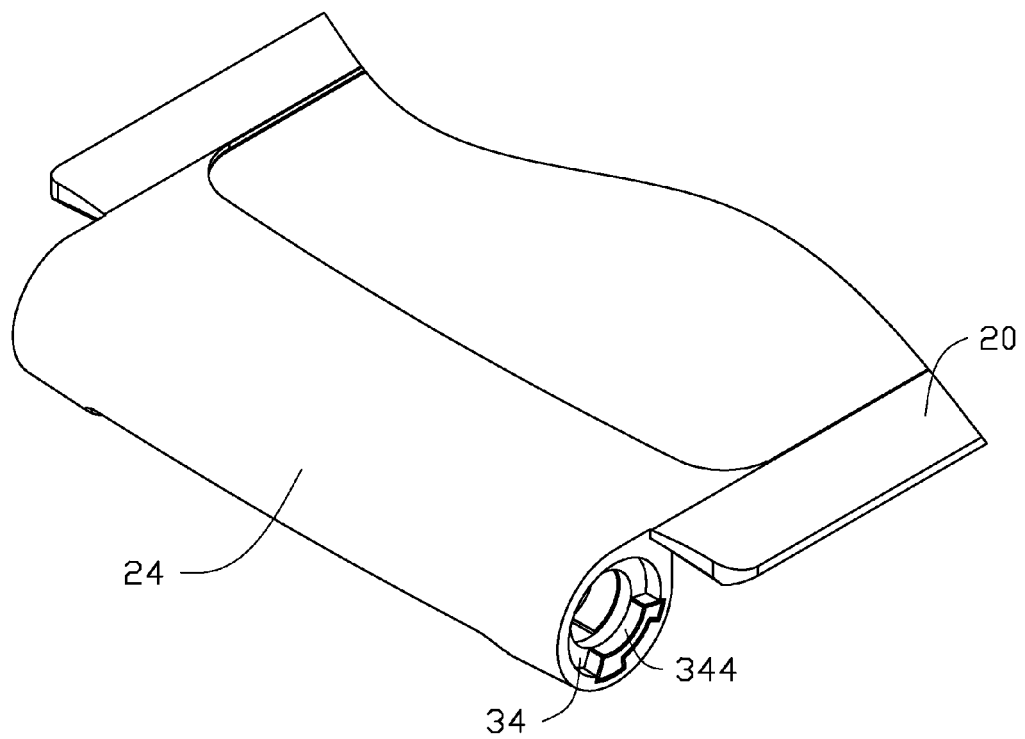
FIG. 4 is an isometric view of a foldable cover and a rotatable member after assembly according to the embodiment shown in FIG. 1.
Figure 5:
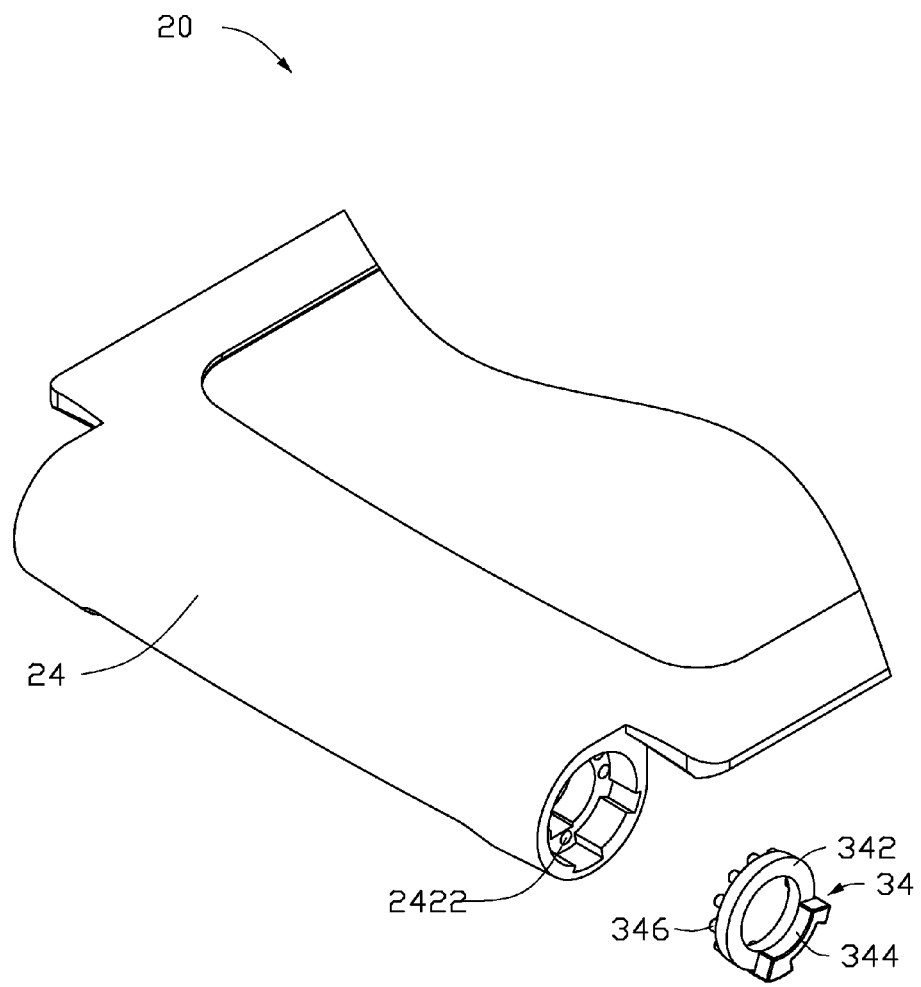
FIG. 5 is similar to FIG. 4, but in an exploded view.

Referring further to FIGS. 4 and 5, the rotatable member 34 includes a ring 342 and a second block 344 protruding from the ring 342. The ring 342 defines a through ring hole 3422. The rotatable member 34 further includes fixing posts 346 for fixing the rotatable member 34 to the foldable cover 20 by fixing into fixing holes 2422 of the foldable cover 20. The fixing posts 346 are spaced from each other and extend longitudinally from the ring 342 and along the axis of the ring hole 3422. The fixing holes 2422 correspond to the fixing posts 346, spaced from each other and longitudinally defined in an end portion 24 of the foldable cover 20.

Figure 6:
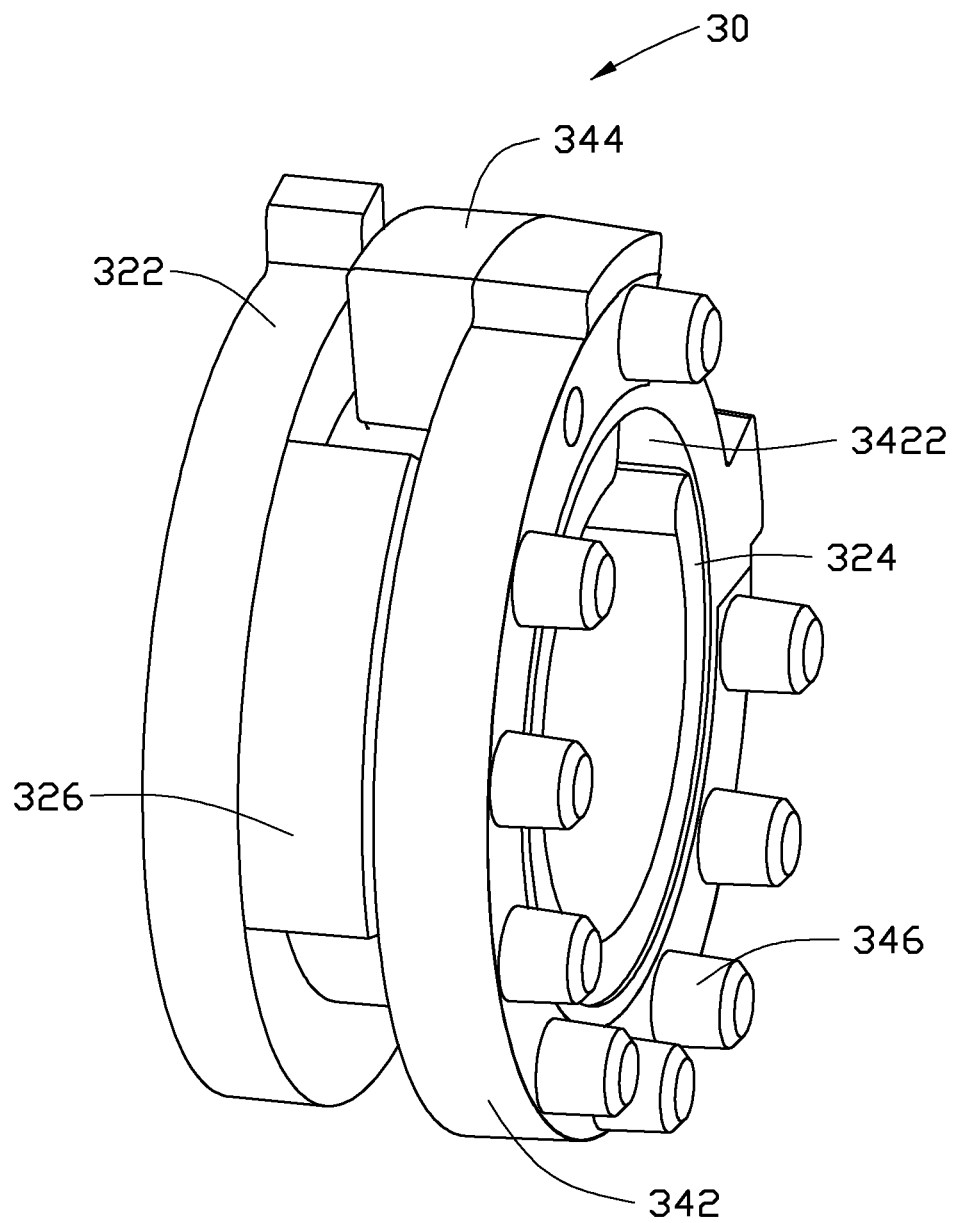
FIG. 6 is an isometric view of a cover stopper structure by assembling the stopper in FIG. 2 and the rotatable member in FIG. 4.

Referring further to FIG. 6, the ring 342 can rotatably coil around the tube 324 by receiving the tube 324 through the ring hole 3422. When the rotatable member 34 rotates along the stopper 32 at a predetermined angle, the first block 326 resists against the second block 344 and thus stops the rotation of the rotatable member 34 relative to the stopper 32.

Figure 7:
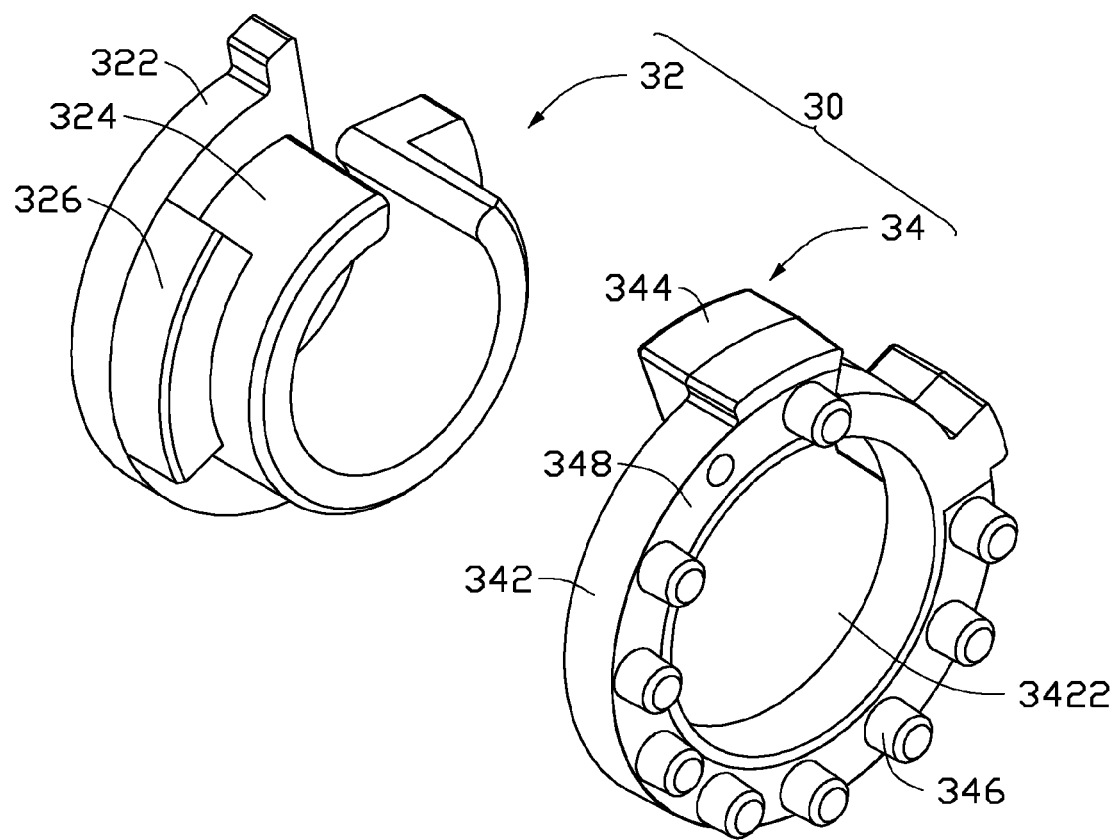
FIG. 7 is similar to FIG. 6, but in an exploded view.
Figure 8:
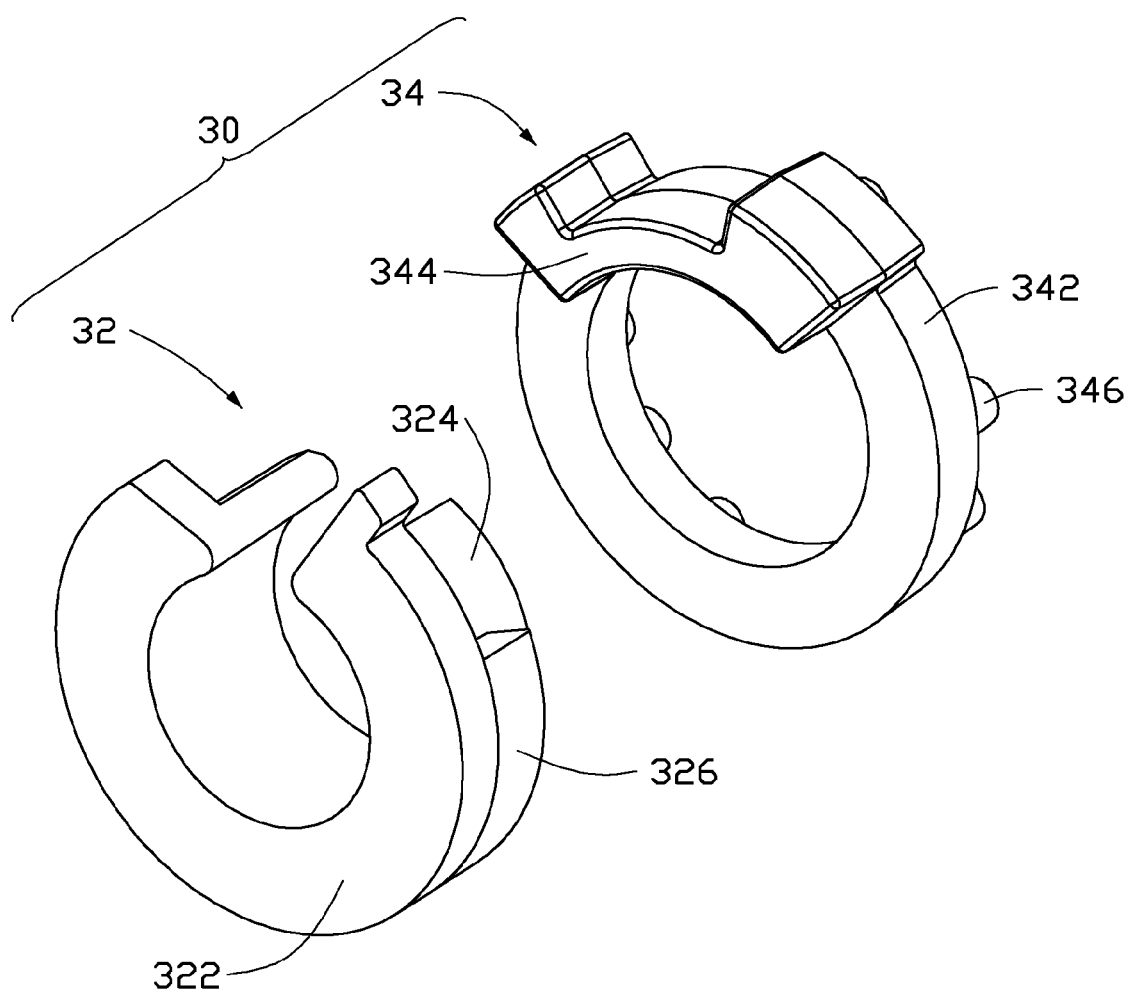
FIG. 8 is similar to FIG. 7, but at a different view angle.
Figure 9:
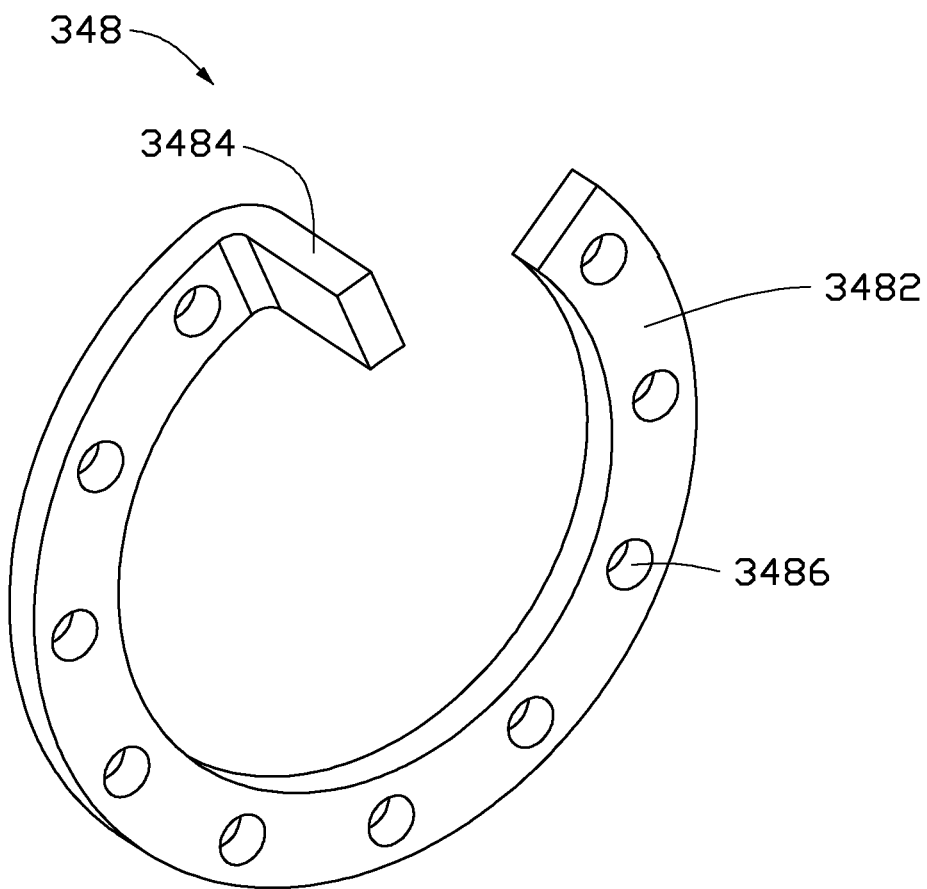
FIG. 9 is an isometric view of a metal frame shown in FIG. 7.

For further enhancing strength of the rotatable member 34, as best shown in FIGS. 7 and 9, a metal frame 348 can be insert molded into the rotatable member 34. The metal frame 348 includes a first strengthening section 3482 and a second strengthening section 3484 curvedly extending from the first strengthening section 3482. The first strengthening section 3482 is secured to exterior surface of the ring 342, and secure holes 3486 through the first strengthening section 3482 receives and secures the fixing posts 346, respectively. The second strengthening section 3484 is embedded in the second block 344.

A method for assembling the cover stopper structure 30 into the electronic device 100 includes the following steps. The mounting plate 322 of the stopper 32 can be fixed into a first mounting hole 142 in the frame cover 10 for example by adhering (see FIGS. 2 and 3). The fixing posts 346 of the rotatable member 34 insert and fix into the fixing holes 2422 for example by adhering (see FIGS. 4 and 5). The foldable cover 20 is assembled to the frame cover 10, so that an end portion 24 of the foldable cover 20 is positioned between the first mounting portion 14 and the second mounting portion 16, the ring 342 coils around the tube 324, and the tube 324 engages through the ring hole 3422 (see FIGS. 1 and 6). In this case, the rotatable member 34 can rotate relative to the stopper 32 until the first block 326 resists against and stops the second block 344. The assembly of the cover stopper structure 30 to the frame covers 10 and the foldable cover 20 is completed.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A cover stopper structure, comprises:
   a stopper made of a metal material, the stopper including a first block;
   a rotatable member made of Polyoxymethylene, rotatable along the stopper and stoppable by the stopper, the rotatable member including a ring and a second block; and
   a metal frame embedded in the ring and the second block;
   wherein the metal frame includes a first strengthening section and a second strengthening section curvedly extending from the first strengthening section, the first strengthening section is secured to the ring, the second strengthening section is embedded in the second block.

2. The cover stopper structure as claimed in claim 1, wherein the metal frame is insert molded into the rotatable member.

3. The cover stopper structure as claimed in claim 1, wherein:
   the stopper further includes a tube, the first block is formed on a circumferential surface of the tube, the second block is protruding from the ring, the ring is rotatably coiling around the tube,
   when the rotatable member rotates along the stopper at a predetermined angle, the first block resists against the second block, stopping the rotation of the rotatable member relative to the stopper.

4. The cover stopper structure as claimed in claim 3, wherein the stopper further includes a mounting plate, the tube and the first block extend from the same surface of the mounting plate.

5. The cover stopper structure as claimed in claim 3, wherein ring defines a through ring hole, the rotatable member further includes fixing posts spaced from each other and extend longitudinally from the ring and along the axis of the ring hole.

6. A foldable electronic device, includes:
   a frame cover;
   a foldable cover foldably mounted on the frame cover;
   a cover stopper structure, comprising:
      a stopper fixed to the frame cover and made of a metal material, the stopper including a first block;
      a rotatable member fixed to the foldable cover, made of Polyoxymethylene, rotatably along the stopper and can be stopped by the stopper, the rotatable member including a ring and a second block; and
      a metal frame embedded in the ring and the second block;
      wherein the metal frame includes a first strengthening section and a second strengthening section curvedly extending from the first strengthening section, the first strengthening section is secured to the ring, the second strengthening section is embedded in the second block.

7. The foldable electronic device as claimed in claim 6, wherein:
   the stopper further includes a tube, the first block is formed on a circumferential surface of the tube, the second block is protruding from the ring, the ring is rotatably coiling around the tube,
   when the rotatable member rotates along the stopper at a predetermined angle, the first block resists against the second block, stopping the rotation of the rotatable member relative to the stopper.

8. The foldable electronic device as claimed in claim 7, wherein the stopper further includes a mounting plate, the tube and the first block extend from the same surface of the mounting plate.

9. The foldable electronic device as claimed in claim 8, wherein the frame cover defines a first mounting hole, the mounting plate is fixed in the first mounting hole, fixing the stopper to the frame cover.

10. The foldable electronic device as claimed in claim 7, wherein the ring defines a through ring hole, the rotatable member further includes fixing posts spaced from each other and extend longitudinally from the ring and along the axis of the ring hole.

11. The foldable electronic device as claimed in claim 10, wherein the foldable cover defines fixing holes, the fixing posts fixed in the fixing holes, fixing the rotatable member to the foldable cover.

* * * * *